United States Patent
Hong et al.

(10) Patent No.: US 9,854,473 B2
(45) Date of Patent: Dec. 26, 2017

(54) EFFICIENT STEERING FOR USER EQUIPMENTS IN EITHER AN IDLE STATE OR A CONNECTED STATE

(71) Applicant: AVAGO TECHNOLOGIES GENERAL IP (SINGAPORE) PTE. LTD., Singapore (SG)

(72) Inventors: Wei Hong, Beijing (CN); Na Wei, Beijing (CN); Wei Bai, Beijing (CN); Haiming Wang, Beijing (CN); Jari Jaakko Isokangas, Tampere (FI)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 19 days.

(21) Appl. No.: 14/910,968

(22) PCT Filed: Aug. 8, 2013

(86) PCT No.: PCT/CN2013/081087
§ 371 (c)(1),
(2) Date: Feb. 8, 2016

(87) PCT Pub. No.: WO2015/018032
PCT Pub. Date: Feb. 12, 2015

(65) Prior Publication Data
US 2016/0205591 A1   Jul. 14, 2016

(51) Int. Cl.
*H04W 28/08* (2009.01)
*H04W 40/02* (2009.01)
(Continued)

(52) U.S. Cl.
CPC .......... *H04W 28/08* (2013.01); *H04L 45/306* (2013.01); *H04W 24/08* (2013.01);
(Continued)

(58) Field of Classification Search
CPC . H04W 28/08; H04W 40/02; H04W 28/0289; H04W 24/08; H04W 84/12; H04L 45/306
(Continued)

(56) References Cited

U.S. PATENT DOCUMENTS

2006/0039333 A1\* 2/2006 Pirzada ............... H04W 72/087
370/338
2012/0224481 A1\* 9/2012 Babiarz ............... H04L 43/0876
370/230.1
(Continued)

FOREIGN PATENT DOCUMENTS

WO   2012/139278 A1   10/2012
WO   2013/068787 A1   5/2013

OTHER PUBLICATIONS

International Search Report dated May 26, 2014 in PCT/CN2013/081087 filed Aug. 8, 2013.

*Primary Examiner* — Christine Ng
(74) *Attorney, Agent, or Firm* — Oblon, McClelland, Maier & Neustadt, L.L.P.

(57) ABSTRACT

For use in offloading traffic to a wireless local area network (WLAN) a user equipment (UE) receives from a wireless wide area network at least a first set of thresholds having different thresholds corresponding to different types of data to be offloaded. The UE utilizes the threshold corresponding to a given type of data to evaluate whether an access node operating in the WLAN is suitable for offloading data of the given type. Only if the evaluated access node is determined to be suitable will the UE use it for offloading, and only for data of the given type. In other non-limiting embodiments the first set of thresholds has different thresholds corresponding to different data-types for different categories (e.g., subscription levels) of the UE; and there may be a second set
(Continued)

202: store in a local memory of the UE at least a first set of thresholds for use in offloading traffic to a WLAN
- the UE receives at least the first set of thresholds from a wireless wide area network, and
- the first set of thresholds comprise different thresholds corresponding to different types of data to be offloaded
  - delay intolerant data (voice and video data) and
  - delay tolerant data (file transfer protocol data and Internet data that is not also voice or video data)

204: the UE utilizes the threshold(s) corresponding to a given type of data to evaluate whether an access node operating in the WLAN is suitable for offloading data of the given type 206: the UE utilizes the evaluated access node for offloading only the data of the given type only if the access node is determined to be suitable of thresholds with different thresholds corresponding to different classifications of different WLAN access nodes.

18 Claims, 3 Drawing Sheets

(51) Int. Cl.
*H04W 24/08* (2009.01)
*H04W 28/02* (2009.01)
*H04L 12/725* (2013.01)
*H04W 84/12* (2009.01)

(52) U.S. Cl.
CPC ....... *H04W 28/0289* (2013.01); *H04W 40/02* (2013.01); *H04W 84/12* (2013.01)

(58) Field of Classification Search
USPC .................................. 370/328, 338, 401, 465
See application file for complete search history.

(56) References Cited

U.S. PATENT DOCUMENTS

| | | |
|---|---|---|
| 2013/0083653 A1 | 4/2013 | Jain et al. |
| 2013/0083661 A1* | 4/2013 | Gupta ............... H04W 28/0215 370/235 |
| 2013/0083726 A1 | 4/2013 | Jain et al. |
| 2013/0083783 A1 | 4/2013 | Gupta et al. |
| 2013/0084885 A1 | 4/2013 | Jain et al. |
| 2013/0084894 A1 | 4/2013 | Jain et al. |
| 2013/0086653 A1 | 4/2013 | Gupta |
| 2014/0031054 A1 | 1/2014 | Zou et al. |
| 2014/0082697 A1* | 3/2014 | Watfa .................. H04W 76/025 726/3 |
| 2014/0133294 A1* | 5/2014 | Horn ................. H04W 28/0247 370/230 |
| 2015/0124601 A1* | 5/2015 | Li ......................... H04W 28/08 370/230 |

* cited by examiner

202: store in a local memory of the UE at least a first set of thresholds for use in offloading traffic to a WLAN
- the UE receives at least the first set of thresholds from a wireless wide area network, and
- the first set of thresholds comprise different thresholds corresponding to different types of data to be offloaded
    o delay intolerant data (voice and video data) and
    o delay tolerant data (file transfer protocol data and Internet data that is not also voice or video data)

204: the UE utilizes the threshold(s) corresponding to a given type of data to evaluate whether an access node operating in the WLAN is suitable for offloading data of the given type 206: the UE utilizes the evaluated access node for offloading only the data of the given type only if the access node is determined to be suitable

EFFICIENT STEERING FOR USER EQUIPMENTS IN EITHER AN IDLE STATE OR A CONNECTED STATE

TECHNICAL FIELD

The exemplary and non-limiting embodiments of this invention relate generally to wireless communication systems, methods, devices and computer programs and, more specifically, relate to

BACKGROUND

Increasing demands for wireless data traffic, driven by widespread adoption of smart phones, tablets and other portable devices with their corresponding mobile applications, continues to strain the capacity limits of currently deployed wireless networks. As a result, wireless network operators are increasingly utilizing unlicensed (or more generally license-exempt) WiFi spectrum to cope with network congestion. This trend is expected to accelerate further as traffic demand continues to grow.

The use of unlicensed spectrum is a cost-effective means to add to the capacity of existing wireless networks, particularly given that there is limited availability for further licensed spectrum and also that radio spectrum remains quite expensive to license. There are several main sources of license-exempt spectrum that may be used for the purposes of offloading traffic to relieve congestion on licensed spectrum. One is the ISM (industrial, scientific and medical) radio bands, which were originally reserved internationally for the use of radiofrequency (RF) energy for industrial, scientific and medical purposes other than personal communications. In recent years these ISM bands have also been shared with license-free and error-tolerant communications applications such as wireless local area networks (WLANs) and cordless phones in the 915 MHz, 2.450 GHz, and 5.800 GHz bands. One such communication application on these ISM bands is 'WiFi'. 'WiFi' is not a technical term, but the WiFi Alliance has generally enforced its use to describe only a narrow range of connectivity technologies including wireless WLANs based on the IEEE 802.11 set of technical standards which generally operate in the 2.4, 3.6 and 5 GHz frequency bands. For example, ISM band 2.4 GHz is used by WiFi with radio standards IEEE 802.11b and 802.11g/n, and ISM band 5 GHz with radio standards IEEE 802.11a/n/ac.

The E-UTRA (Evolved Universal Mobile Telecommunication System Radio Access, sometimes referred to as Long Term Evolution or LTE) system currently integrates WLAN as a separate access network to the 3GPP evolved packet core. This incurs the extra cost of deploying the complete WLAN access network alongside the E-UTRA network and also impacts the 3GPP core network entities. Existing WiFi offload solutions are based on this deployment model of distinct 3GPP and WLAN access networks using a common core with selective switching of flows based on operator/user policies. Other solutions are possible that result in a tighter integration and aggregation of 3GPP access network components with WLAN access networks without any impact to and reusing the same 3GPP core network elements.

The 3GPP has study items for investigating whether carrier aggregation principles can be used for aggregation/coordination of cells/carriers across WLANs; see for example documents RP-111094 by Intel Corporation entitled _Discussion on Carrier Aggregation across LTE and WIFI_ and RP-111104 by Intel Corporation and Vodaphone entitled _New Study Item Proposal for Radio Level Dynamic Flow Switching between 3GPP-LTE and WLAN_ [both from 3GPP TSG-RAN Meeting #53; Fukuoka, Japan; Sep. 13-16, 2012]. Proposal RP-121780 by Intel Corporation entitled New Study Item Proposal on WLAN/3GPP Radio Interworking [3GPP TSG-RAN Meeting & 58; Barcelona, Spain; Dec. 4-7, 2012] has been adopted by the 3GPP and among its objectives are to evaluate LTE-WLAN and UTRA-WLAN interworking procedures while improving seamless and non-seamless mobility. Further background of a general nature for WLAN procedures can be seen at IEE 802.11TM-2007 entitled _WLAN MAC and PHY Specifications._

Embodiments of the teachings set forth below further consider E-UTRA and WLAN interworking, but these are only specific examples of interworking among a wide area network and a local area network for which these teachings may be deployed.

SUMMARY

In a first exemplary aspect of the invention there is a method for operating a radio device. In this aspect the method comprises:
  storing in a local memory of the user equipment at least a first set of thresholds for use in offloading traffic to a wireless local area network, wherein
    at least the first set of thresholds is received from a wireless wide area network, and
    the first set of thresholds comprise different thresholds corresponding to different types of data to be offloaded;
  utilizing the threshold corresponding to a given type of data to evaluate whether an access node operating in the wireless local area network is suitable for offloading data of the given type; and
  utilizing the evaluated access node for offloading only the data of the given type only if the access node is determined to be suitable.

In a second exemplary aspect of the invention there is an apparatus for operating a user equipment and the apparatus comprises a processing system. The processing system itself comprises at least one processor, and at least one memory including computer program code. In this aspect the processing system is configured to cause the user equipment to at least:
  store in a local memory of the user equipment at least a first set of thresholds for use in offloading traffic to a wireless local area network, wherein
    at least the first set of thresholds is received from a wireless wide area network, and
    the first set of thresholds comprise different thresholds corresponding to different types of data to be offloaded;
  utilize the threshold corresponding to a given type of data to evaluate whether an access node operating in the wireless local area network is suitable for offloading data of the given type; and
  utilize the evaluated access node for offloading only the data of the given type only if the access node is determined to be suitable.

In a third exemplary aspect of the invention there is a computer readable memory tangibly storing a set of computer readable instructions that are executable on a data processing system for operating a user equipment. The computer readable instructions comprise:

code for storing in a local memory of the user equipment at least a first set of thresholds for use in offloading traffic to a wireless local area network, wherein at least the first set of thresholds is received from a wireless wide area network, and the first set of thresholds comprise different thresholds corresponding to different types of data to be offloaded;

code for utilizing the threshold corresponding to a given type of data to evaluate whether an access node operating in the wireless local area network is suitable for offloading data of the given type; and code for utilizing the evaluated access node for offloading only the data of the given type only if the access node is determined to be suitable.

In a fourth exemplary aspect of the invention there is an apparatus for operating a user equipment. In this aspect the apparatus comprises memory means and processing means and communication means.

The memory means is for storing at least a first set of thresholds for use in offloading traffic to a wireless local area network, wherein at least the first set of thresholds is received via the communication means from a wireless wide area network, and the first set of thresholds comprise different thresholds corresponding to different types of data to be offloaded;

The processing means is for utilizing the threshold corresponding to a given type of data to evaluate whether an access node operating in the wireless local area network is suitable for offloading data of the given type; and The communication means is for utilizing the evaluated access node for offloading only the data of the given type only if the access node is determined to be suitable.

In one non-limiting example embodiment the memory means comprises a computer readable memory; the processing means comprises at least one digital processor; and the communication means comprises at least one of a radio transmitter and a radio receiver, with or without a modem.

These and other aspects are detailed below with more particularity.

BRIEF DESCRIPTION OF THE DRAWINGS

FIG. 2 is a logic flow diagram illustrating the operation of a method, a result of execution of by apparatus, and execution of computer instructions comprising code embodied on a computer readable memory, for both a network access node and for a UE practicing certain exemplary embodiments of this invention.

DETAILED DESCRIPTION

Figure 1:
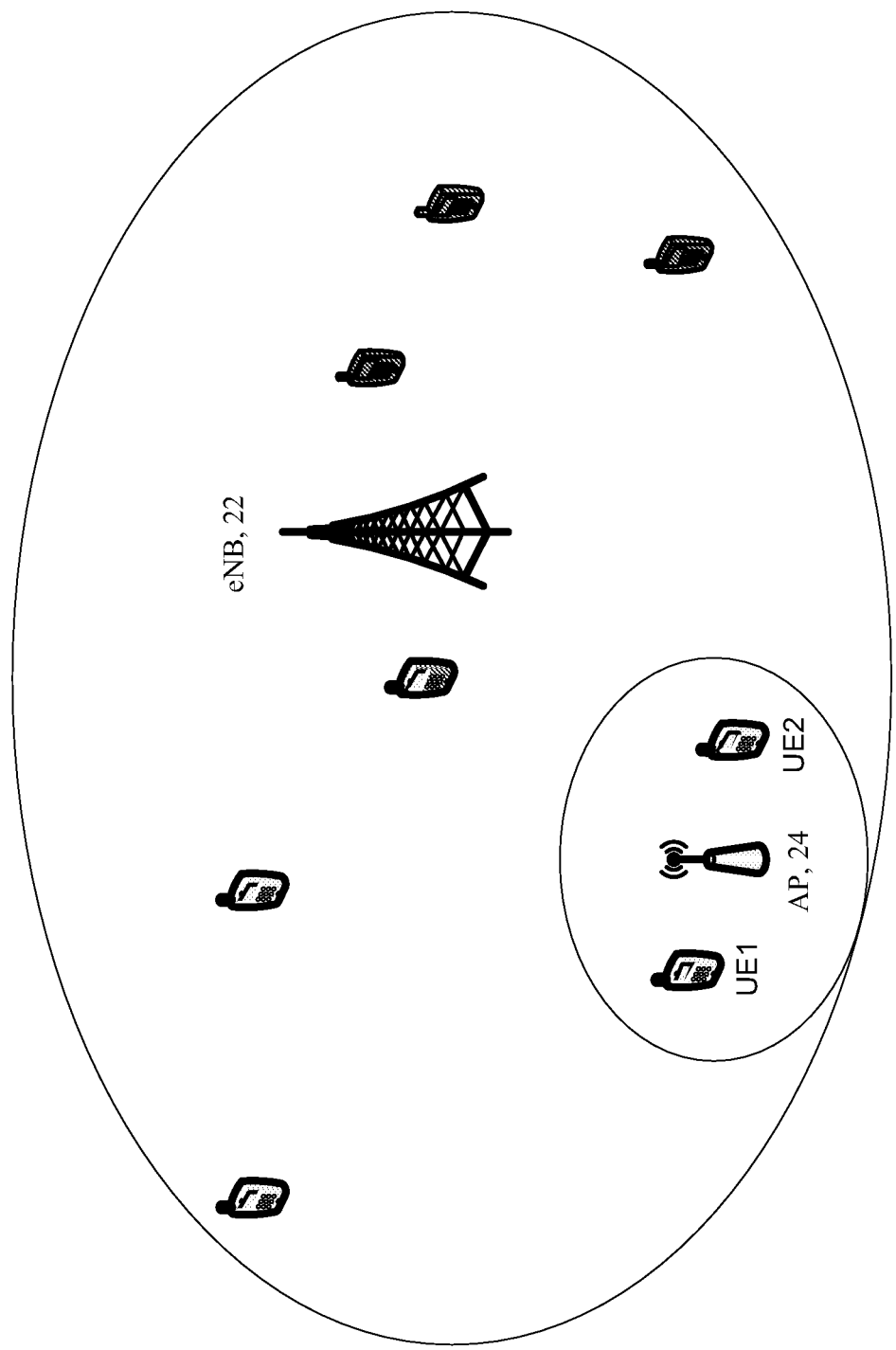
FIG. 1 is a conceptual schematic diagram illustrating an exemplary radio environment in which these teaching may be practiced.

The examples detailed herein are in the context of a UE operating or camping in a macro cell of a wireless wide area network radio network utilizing the E-UTRAN radio access technology (including LTE and LTE-Advanced) interworking with a WLAN/WiFi system or other type of wireless local area network operating in license exempt spectrum, but this is only one example in order to provide a practical context for describing the inventive concepts detailed herein. These teachings may be utilized with other types of radio access technology interworkings among wide and local area networks, such as for example UTRA, including Wideband Code Division Multiple Access (WCDMA) and High Speed Packet Access (HSPA), Global System for Mobile Communications (GSM), and the like; which may interwork with some other radio access technology for local area networks on the license exempt spectrum for offloading traffic. Further, these teachings are not limited only to geographically small cells (those operating with restricted transmit power) which is the typical but not universal case for radio access nodes/networks operating in license-exempt spectrum. The specific names of the various network entities in the examples below follow the nomenclature for E-UTRA networks (E-UTRANs), and these names also are not limiting to the broader teachings presented below but to provide an example of a specific and practical deployment of these teachings.

Further to the background above, the latest agreement in 3GPP [during RAN2 Meeting #81bis] is to investigate three candidate solutions for selecting between the WLAN and the UTRAN/E-UTRAN in an interworking scenario. For brevity, the term WAN (wide area network) as used herein refers to the (E-UTRA or UTRA) wireless wide area network which in these examples is operating on the licensed-bands, and WLAN is used to refer to the wireless local area network which in these non-limiting examples is operating on the license-exempt bands.

The first candidate solution is for the WAN to provide assistance information to the user equipment (UE), and based on this information and based on some selection rules (access network discovery and selection function ANDSF which are not from the WAN) the UE steers its traffic to either the WLAN or the WAN. This first candidate solution is applicable to UEs in radio resource control (RRC) IDLE and also CONNECTED states for E-UTRAN; and for the CELL_DCH (dedicated channel), CELL_FACH (forward access channel), CELL_PCH (paging channel) and URA_PCH (UTRAN registration area) states for UTRAN.

The second candidate solution has the WAN providing access network selection parameters (for example; thresholds, priorities, rules) and based on these parameters the UE steers traffic to the WLAN or the WAN. This second candidate solution is applicable to UEs in the same states as noted above for the first candidate solution.

For the third candidate solution, if the UE is in a RRC CONNECTED (E-UTRAN) or a CELL_DCH (UTRAN) state, the UE's offloading is controlled by the WAN using dedicated traffic steering commands (which may be based also on WLAN measurements). If instead the UE in an E-UTRAN in the RRC IDLE (E-UTRAN) or in the UTRAN is in either the CELL_PCH or the URA_PCH state, the solution is similar to that noted above for the second candidate solution.

The inventors consider that for both the network based third solution candidates as well as the UE based first solution candidate would require some compromise between the operator, network vender and UE vendor. For this reason the second candidate solution seems viable. For example, in both the RRC CONNECTED and RRC IDLE state the UE will make its own decision which radio access technology to use according to the load information, signal to noise information, and so forth. But different network operators may have different policies, and would prefer different policies for different traffic types. For example, some Internet or file transfer protocol traffic may require a higher signal to noise ratio to achieve a lower block error rate, while at the same time the delay requirements may not be as stringent as voice or video services. For certain real time services such as voice, the delay requirements would normally be strict but the block error rate requirements may be more relaxed than for non-voice (Internet or file) data. Thus the different network operators may prefer different requirements for the offload decision for different types of (data) services, and/or for different load situations or signal to noise ratios (or other factors) in the WAN.

Traditional cell selection procedures used in cellular systems are not entirely suitable for WLAN offloading purposes, not least because they only apply for user equipments (UEs) in the idle mode whereas offloading to a WLAN needs to address also UEs in a connected mode. Additionally, cell selection traditionally does not take traffic type, UE type, or WLAN access point (AP) capacity (as well as other relevant factors) into account, and so the result may be a poor decision whether or not to offload. Signal to noise ratio, as is used in traditional cell selection criteria, is not sufficient for offloading decisions, since for example a UE may offload to a WLAN AP having a high signal to noise ratio but if that AP is too congested the UE will not be able to obtain the services it desires. Thus the second candidate solution above is itself an incomplete solution for interworking scenarios.

According to example embodiments of these teachings, each network operator chooses what offloading criteria, and the UEs in its WAN will base their offloading decision on these criteria. In this interworking regard there are two distinct sets of criteria, one set related to the UE and one set related to the AP. For the set related to the UE the criteria may include different thresholds for different UE types (for example, the UE type may be based on its network subscription category) so that one UE type uses SNR threshold #1 and a different UE type uses SNR threshold #2 for their respective offloading decision. For the set related to the AP this also may be different thresholds but for different types of WLAN APs. In a particular non-limiting embodiment these are all also specific for traffic type, so for example for a given UE type there would be one SNR threshold if the traffic is one type (delay tolerant for example) and a different SNR threshold for a different type of traffic to be offloaded (delay intolerant for example). There may in this embodiment also be AP selection criteria that is different for different traffic types. The network also provides to the UE a rule or algorithm for making its final decision as to which AP to offload which of the UE's services (data types) based on the inputs of UE type (which may be implemented as the UE's E-UTRAN/UTRAN subscription type), AP type, thresholds for those types, traffic type to be offloaded, and so forth. This approach allows the individual network operators quite a large degree of autonomy in controlling what traffic gets offloaded under what conditions, but puts the final decision within the UE to avoid excess overhead signaling. Various embodiments may employ one, some or all of the above different type-specific thresholds for the UE's offloading decision.

For clarity of the description below, FIG. 1 is a conceptual schematic diagram illustrating an exemplary but non-limiting radio environment in which these teaching may be practiced. While FIG. 1 utilizes an access point (AP) 24 as the network access node of the wireless local area network that is operating in the license-exempt radio spectrum, and an e-Node B (eNB) 22 as the access node of the wireless wide area network operating in the licensed spectrum. But note that these example network nodes and the radio access technologies they imply are not limiting to the broader teachings herein. FIG. 1 illustrates two UEs (UE1 and UE2) within the radio range of the AP 24, and these UEs may have dual connections with the AP 24 and with the eNB 22 which provides the UEs with the offload criteria and thresholds.

The relatively large geographic coverage area of a eNB 22 is shown in FIG. 1 as the larger oval which represents the wide area network (though it may be extended by other eNBs). Within that relatively large coverage area is an AP 24 having a relatively small coverage area as FIG. 1 illustrates via the smaller oval surrounding the AP 22 which represents the local area network. While only one AP 24 is shown in FIG. 1 it is understood there may be multiple different APs within the eNB's coverage area, or which extend the eNB's coverage area, which are candidate APs available for offloading traffic depending on the specific thresholds/criteria that the UE evaluates in its offloading decision. At least in the WLAN radio access technology, typically each of these APs would control their own distinct local area network.

The illustrated access nodes 22, 24 are assumed to be operating on different first and second frequencies, the first representing licensed spectrum such as conventional cellular and the second representing license-exempt spectrum such as the ISM band, television white spaces (TVWS) and so forth. These first and second frequencies may be considered by the wide area network and by the UEs as first and second component carriers when the radio spectrum utilized by the wide area network operator is parsed via carrier aggregation, with the second (license-exempt) frequency/carrier considered as a secondary carrier. In this case the (licensed) first frequency/carrier would be the UE's primary component carrier which carries at least some of the UE's control channels and control information.

In one deployment the eNB 22 and AP 24 may be co-located, but in another deployment they are not. In any case the eNB 22 and the AP 24 are considered as functionally distinct entities; the UE recognizes them by different identifiers and by the different radio access technologies they utilize. Either access node 22, 24 may be implemented as a remote radio head (RRH). There are multiple UEs illustrated at FIG. 1 but only UE1 and UE2 are relevant for the particular description herein since the other UEs are outside the AP's range and could not offload to it regardless of the offload criteria and thresholds that the eNB 22 might provide them. Assume for FIG. 1 that both UE1 and UE2 are capable of offloading to the illustrated AP 24; each of these UEs is assumed to have two radio-frequency (RF) chains for simultaneous communication with access nodes 22 and 24 operating on different radio frequencies and operating with different radio access technologies.

Firstly, the eNB 22 (or possibly a previous eNB of the same wireless wide area network if the subject UE was handed off to that currently serving eNB 22) sends to the UE or otherwise configures the UE with the set or sets of thresholds as noted above. For convenience this information may be considered at least a first set of thresholds, and it may be broadcast to all the UEs in the wide area network cell via system information or it may be provided by the eNB 22 in point-to-point dedicated signaling for the case of UEs in the CONNECTED or other non-idle state/mode. The UE stores in its local memory at least this first set of thresholds for use in offloading traffic to the wireless local area network, which in these examples is operating in license-exempt radio spectrum. This first set of thresholds comprise different thresholds corresponding to different types of data to be offloaded. This is not to imply the UE must have all of these different types of data available for offloading, but the UE does store the different thresholds in case it has data of one type or another to offload during the course of its association with the eNB 22.

There may be further offloading criteria relevant to the licensed band/wide area network that the network operator enforces for offloading traffic to the local area network on the license-exempt spectrum, for example load on the licensed frequency band, signal quality (signal to noise ratio SNR) on the licensed frequency band, and the like. This is so that the UE's evaluation of any neighbor/candidate APs for offload purposes only occurs when there is a need to relieve congestion in the licensed band E-UTRAN/UTRAN cell. These further criteria are assumed to be in addition to the WLAN offload thresholds detailed herein, and since such further offloading criteria (which evaluate congestion on the band from which traffic is to be offloaded) are known in the art they are not detailed hereinafter. In some embodiments of these teachings the further offloading criteria may be evaluated by the UE alongside or immediately preceding the UE's evaluation of candidate APs for offload, but in other embodiments they may be evaluated by the eNB 22 which then signals the UE when appropriate (via system information or point-to-point signaling for example) to indicate that the UE should look for and evaluate candidate APs for offloading traffic using the set(s) of thresholds according to these teachings.

With the set of thresholds now stored in the UE's local memory, now assume that the UE knows there is a need to offload traffic from the wireless wide area network and the licensed band and that it needs to evaluate candidate APs for this offloading purpose. Once the UE has a certain type of data that it seeks to offload, the UE then utilizes the threshold corresponding to that given type of data to evaluate whether another access node, in the wireless local area network and operating in the license-exempt radio spectrum, is suitable for offloading data of that given type. The data may be uplink or downlink; the UE of course knows what type of data it has to send uplink but it also knows whether a pending downlink of data is of the type file-transfer protocol, http (or https), voice or video; and so can accurately anticipate the data type for at least most downlink data. If the UE has multiple types of data simultaneously as in the example immediately below the UE will do multiple evaluations of each candidate AP 24, one for each type of data that might possibly be offloaded. But in that case if the UE also finds multiple candidate APs to evaluate, it may truncate further evaluations once the UE finds a suitable candidate for at least one type of data that the UE has for potential offload since in a typical deployment the UE would not be expected to have simultaneous WLAN links with different APs for offloading different types of data.

Only if the UE determines from the above evaluation that the access node of the wireless local area network is suitable does the UE offload its data, and the data that it offloads is only the data of the given type for which the AP 24 was found to be suitable given the threshold corresponding to that data type. Assume an example in which the UE simultaneously has both delay intolerant data (for example, voice) and delay tolerant data (for example, non-voice and non-video http data). The UE will perform separate evaluations of that same AP 24 using the different thresholds for those two different data types. If these separate evaluations find the AP 24 to be suitable for the delay tolerant data but not suitable for the delay intolerant data, in this example the UE will offload to that AP 24 only the delay tolerant data for which the UE found the AP 24 to be suitable for offload purposes, and will not offload the delay intolerant data for which the UE found that same AP 24 to be unsuitable for offload purposes.

The eNB 22 configures new WLAN offloading rules for UEs that are capable of offloading traffic to the WLAN operating in the license-exempt band, and within these rules is at least the first set of thresholds that the network operator chooses for use in its own cells (since it is assumed herein that the same network operator controls both the wide area network and the WLAN or WLANs that is/are used for this offloading). Only when there is at least one available WLAN AP that satisfies the thresholds can the UE make the decision to offload a certain service (for example, a certain data type). The following example provides three offloading rules, but other embodiments of these teachings can use one or two of these rules for the UE's offloading decision, so these example rules may be deployed independently or jointly.

In this example the eNB 22 configures the UE with a first offloading rule which provides different offload threshold offsets from a determined parameter for different traffic (different types of data), so that different traffic of the UE could have different priority to be offloaded either to certain APs or to any available candidate AP. The threshold offset could be applied to all possible offload criteria such as WLAN network load, WLAN radio link quality, and so forth.

For this first offloading rule assume the eNB 22 uses broadcast signaling to configure the UE and also assume that the UE is compatible with IEEE 802.11ac and also that all of the candidate APs are operating on 802.11ac. The eNB configures different offload threshold offsets on the determined parameter for different traffic, so for example, www (http and https) could have www_load_threshold (50%) and www_snr_threshold (15 dB), while VIDEO traffic could have video_load_threshold (60%) and video_snr_threshold (10 dB).

The eNB 22 can also configure the UE with a second offloading rule which provides different offload threshold offsets for UEs with different subscription types, for example a gold subscription account and a silver subscription account with the service provider (which is operating both the eNB 22 and the WLAN AP 24). This enables the network/service operator to provide different types of UEs with different priorities to be offloaded, either to certain APs or to any available AP.

For this second offloading rule assume for example the eNB 22 configures the UE with different offload threshold offsets for UEs with different subscription types. While a given UE may not need to store these thresholds for subscription types other than its own, at least for the case where the wide area network configures its UEs via broadcast signaling, any given UE will receive the thresholds for all UE subscription types and store them all at least in its buffer memory before storing the thresholds relevant to only its own subscription type in a more long term memory, so still an individual UE will at least temporarily store in its (buffer) memory the thresholds for the different UE subscription types. In this example UEs with a 'gold' subscription with the network operator/service provider will utilize a gold_load_lower_threshold (30%) while UEs with a 'silver' subscription with the network operator/service provider will utilize a silver_load_lower_threshold (50%), and all subscription types may also utilize a common load_high_threshold (90%). In this example, if a given AP's load is 30%, only the gold account UEs would find this AP satisfies the corresponding threshold for offloading to the WLAN which this AP operates. Once the AP load is above 50%, also the silver account UEs would find this AP satisfies their corresponding threshold for offloading traffic.

The eNB 22 can also configure the UE with a third offloading rule which provides that different APs have different offload threshold offsets based on the AP's respective different WLAN AP capability. Examples of such different AP capabilities can refer to the AP version, the number of channels on which the given AP 24 is operating, and so forth. The IEEE 802.11 technical standard on which a given AP 24 is operating in the license-exempt band can also be a marker to distinguish different AP capabilities. So for example, a candidate AP operating with IEEE 802.11ac technical standards may have looser offset thresholds than another candidate AP operating with IEEE 802.11a technical standards, since the former AP operating with 802.11ac could provide a higher data rate (all else being equal).

The signaling by which the eNB 22 informs the UE of these rules can be included in the ANDSF, or it can be broadcast to the UEs in the eNB's cell (for IDLE or CONNECTED mode UEs) or it may be unicasted to individual UEs (in the CONNECTED mode). These thresholds may be defined in various ways; the above examples have them defined as an offset from some general or base threshold but in other implementations they may be defined as absolute values.

Now after evaluating the candidate APs according to the thresholds, the UE can put those APs that pass the respective threshold requirement into an offload_AP_candidate_group which is new according to these teachings. So for example once the UE puts a few candidate APs into these different groups, each group corresponding to a different data type for example, the UE then can simply check the APs in the group corresponding to the type of data it next has for offloading and check those APs first (to ensure the offloading threshold is/are still satisfied) before offloading data of that group type.

If for example there is more than one candidate AP in the offload_AP_candidate_group for a given data type that the UE has for offloading, the UE could select one target AP according to multiple conditions by using an adjusted signal to noise ratio (SNR), or alternatively a weighting of points, which the UE uses to evaluate APs for offloading suitability. The candidate APs for the corresponding group can thus be ranked for the UE's final decision for offloading data of that given type to an individual AP 22.

If for example there are multiple parameters to evaluate for offloading purposes for a given AP, the positive or negative effect of each parameter can be converted to a positive or negative offset to the measured signal to noise ratio (SNR) for the link between the UE and that given AP for this final ranking and offloading decision. So for example the eNB 22 may define that medium-load APs will introduce a 3 dB SNR negative offset while high-load APs will introduce a 5 dB SNR negative offset. When comparing to the two measured SNRs for these two APs with different load conditions, the UE will add the offset into its adjustment calculation for its final ranking of all the candidate APs. Then the UE will select one of the candidate WLAN APs based on the adjusted SNR.

Or in the alternative implementation mentioned above, the positive or negative effect of multiple parameters can be weighted so values representing these different parameters can be weighted together as numerical points for the final ranking of APs. In this example the SNR and load can be judged as one of a few distinct levels, such as levels 1 through 5 for SNR and load. If the licensed band network defined that SNR and load effect in the license-exempt band are to be weighted respectively as 30% and 70%, then the final points for a given candidate AP will be weighted accordingly.

Embodiments of these teachings provide the technical effect of providing efficient guidance for UE offloading to a WLAN, particularly for UEs in the IDLE mode, by differentiating among different traffic types, different UE subscription types and/or different WLAN AP types in the above non-limiting examples. In this manner the overall network and UE experiences are improved, and the operator of the wide area network is able to provide its own priorities for traffic, for UEs and for APs as far as offloading decisions are concerned.

Figure 3:
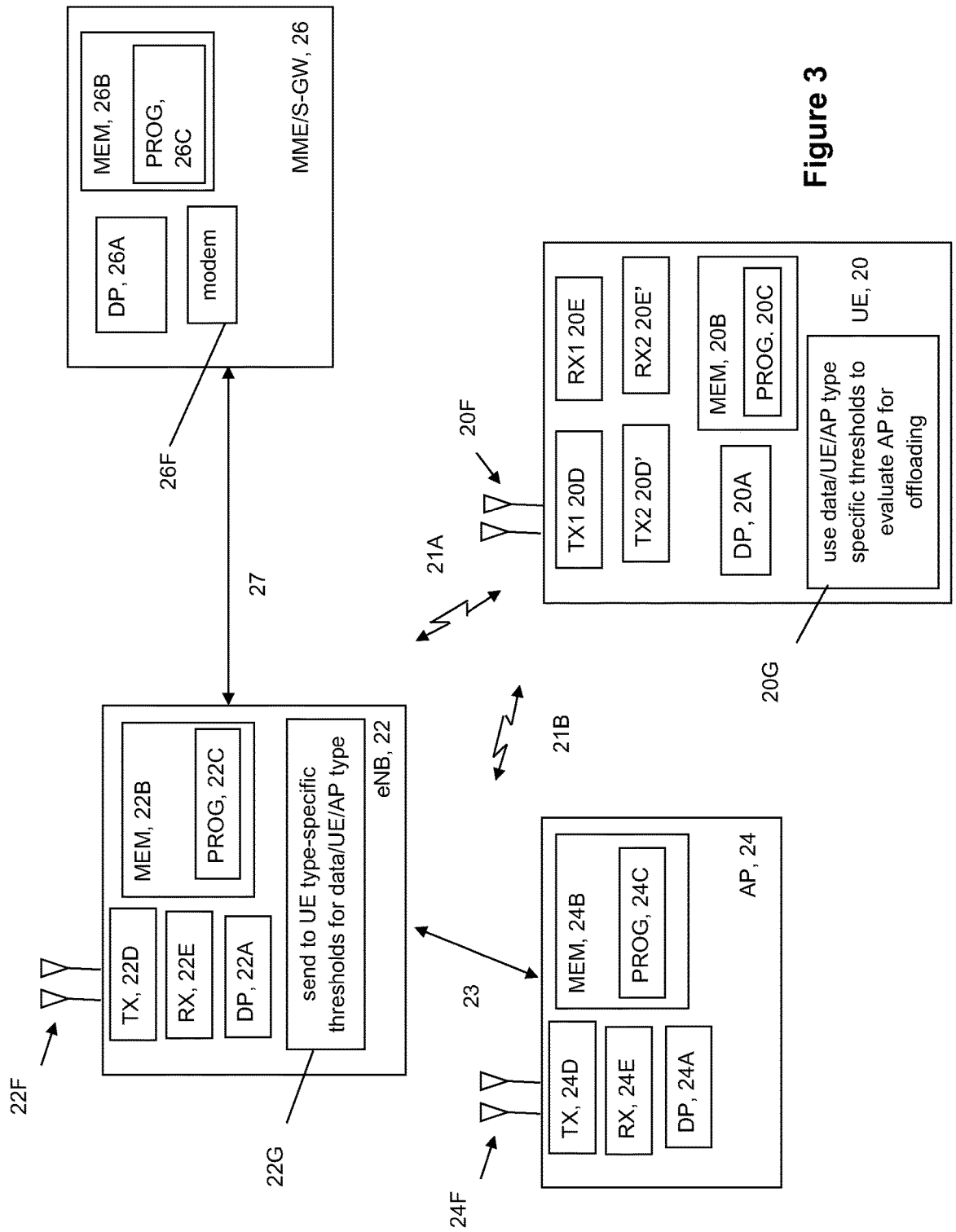
FIG. 3 is a simplified block diagram of a UE in communication with a cellular radio access node (eNB) and a license-exempt radio access node (AP), and illustrates exemplary electronic devices suitable for use in practicing the exemplary embodiments of this invention.

FIG. 2 presents a summary of the above teachings for operating a user equipment (UE), such as UE1 or UE2 as shown in FIG. 1 or the UE shown at FIG. 3. FIG. 2 begins at block 202 where the UE stores in its local memory at least a first set of thresholds for use in offloading traffic to a wireless local area network. At least this first set of thresholds is received from a wireless wide area network, which was shown at FIG. 1 as the eNB 22 operating in licensed radio spectrum. The first set of thresholds comprises different thresholds corresponding to different types of data to be offloaded, such as for example delay intolerant data and delay tolerant data, wherein the delay intolerant data comprises at least voice and video data and the delay tolerant data comprises at least file transfer protocol (FTP) data and Internet (www or more specifically http/https) data that is not also voice or video data.

Then at block 204 the UE utilizes the threshold corresponding to a given type of data (or thresholds if there are multiple thresholds per data type) to evaluate whether an access node operating in the wireless local area network is suitable for offloading data of the given type. In the FIG. 1 example this access node of the wireless local area network that is evaluated is operating in the license-exempt band and is the WLAN AP 24.

And finally at block 206 the UE utilizes the evaluated access node for offloading only the data of the given type, and only if the access node is determined to be suitable.

In the above examples, in one non-limiting embodiment the first set of thresholds comprise, for each different type of data to be offloaded, load on the access node of the wireless local area network; and quality (SNR) of a link between the UE and the access node of the wireless local area network.

In another non-limiting embodiment above, the first set of thresholds further comprise different thresholds corresponding to different types of data to be offloaded for each of a first and a second category of UEs, wherein the first and the second category correspond to different subscription levels of the UE with an operator/service provider of the wireless wide area network.

As noted above, the UE may also be configured with a second set of thresholds which the UE stores in its local memory and utilizes for the evaluating of block 204. This second set of thresholds comprise different thresholds corresponding to different classifications of access nodes/APs operating in one or more wireless local area networks; and in this case block 406 is modified such that the evaluated access node is utilized for offloading only the data of the given type only if the access node is determined to be suitable using the threshold (or thresholds if there is more than one) corresponding to the classification of the evaluated access node. In one example above, the different classifications of the different access nodes correspond to different capabilities of the respective access nodes, which for example may be determined based on which version of IEEE 802.11 technical standards the respective access node is operating.

In a further example embodiment above the UE also determines that there are a plurality of access node candidates operating in one or more wireless local area networks. The UE stores each of these access node candidates in its local memory within one of a plurality of candidate groups, where each candidate group corresponds to one of the different capabilities for which there is a different threshold in the second set.

While the above examples are not limiting, they assumed an evolved UMTS Terrestrial Radio Access (E-UTRA) or a UTRA radio network as the radio access technology in use for the wireless wide area network which operates on the licensed band, and IEEE 802.11/WLAN as the radio access technology in use for the wireless local area network which operates on the license-exempt band.

The logic diagram of FIG. 2 may be considered to illustrate the operation of a method, and a result of execution of a computer program stored in a computer readable memory, and a specific manner in which components of an electronic radio device are configured to cause that electronic device to operate. For example, such an electronic device may be embodied as the entire UE, one or more components thereof such as a modem, chipset, or the like. The various blocks shown in FIG. 2 may also be considered as a plurality of coupled logic circuit elements constructed to carry out the associated function(s), or specific result of strings of computer program code or instructions stored in a memory.

Such blocks and the functions they represent are non-limiting examples, and may be practiced in various components such as integrated circuit chips and modules, and the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Such circuit/circuitry embodiments include any of the following: (a) hardware-only circuit implementations (such as implementations in only analog and/or digital circuitry) and (b) combinations of circuits and software (and/or firmware), such as: (i) a combination of processor(s) or (ii) portions of processor(s)/software (including digital signal processor(s)), software, and memory(ies) that work together to cause an apparatus, such as a UE, to perform the various functions summarized at FIG. 2 and (c) circuits, such as a microprocessor(s) or a portion of a microprocessor(s), that require software or firmware for operation, even if the software or firmware is not physically present. This definition of 'circuitry' applies to all uses of this term in this specification, including in any claims. As a further example, as used in this specification, the term "circuitry" would also cover an implementation of merely a processor (or multiple processors) or portion of a processor and its (or their) accompanying software and/or firmware. The term "circuitry" also covers, for example, a baseband integrated circuit or an application specific integrated circuit (ASIC) or a similar integrated circuit for a server or network device/ radio network access node or a UE which operates according to these teachings.

Reference is now made to FIG. 3 for illustrating a simplified block diagram of various electronic devices and apparatus that are suitable for use in practicing the exemplary embodiments of this invention. Like FIG. 1, FIG. 3 shows two radio access network access nodes 22, 24. The eNB 22 operates in the wide area network and is adapted for communication over a first wireless link 21A (on a licensed frequency band) with an apparatus, such as a mobile terminal or UE 20. The eNB 22 may be any access node such as the illustrated eNB or a NodeB (including frequency selective repeaters and remote radio heads) of any wireless wide area network, such as E-UTRAN/LTE/LTE-Advanced, UTRAN, HSDPA, WCDMA, GSM, GERAN, and the like.

FIG. 3 further shows a second radio access node implemented as a WLAN AP 24 operating in the wide area network and which is adapted for communication over a second wireless link 21B (for example, on a license-exempt frequency band) with the UE 20. The UE 20 may be in a connected, semi-connected or idle state in the wireless wide area network with the eNB 22 but may have some or all of its traffic handled in the wireless local area network by the WLAN AP 22. Or the UE 20 may evaluate this candidate AP 24 and find it does not satisfy the offloading thresholds/ criteria in which case none of the UE's traffic will be handled by this particular AP 24.

There may also be a control interface 23 between these access nodes 22, 24 directly, such as for example an E-UTRAN X2 interface or similar interface over which the access nodes 22,24 may coordinate with one another in anticipation of the start or termination of the UE's offload traffic according to these teachings.

The operator of these access nodes 22, 24 may also control a network control element or other higher network entity such as a radio network controller RNC in the case of UTRAN and WCDMA/HSDPA wide area networks, or a mobility management entity MME for the case of LTE/LTE-Advanced wide area networks in which case the MME may also serve as the serving gateway S-GW as shown at FIG. 3. This higher network entity 26 generally provides connectivity with the core cellular network and with further networks (e.g., a publicly switched telephone network PSTN and/or a data communications network/Internet), though typically traffic through the WLAN AP 24 and the local area network will not pass through the MME or RNC since the AP 24 is not part of the E-UTRA/UTRA wide area network.

The UE 20 includes processing means such as at least one data processor (DP) 20A, storing means such as at least one computer-readable memory (MEM) 20B storing at least one computer program (PROG) 20C, and communication means such as a transmitter TX1 20D and a receiver RX1 20E for bidirectional wireless communications with the eNB 22 in the wide area network using the operative radio access technology. The UE 20 may also have a second RF chain, shown for the UE 20 as a second TX2 20D' and a second RX2 20E' for bidirectional wireless communications with the AP 24 in the local area network and which in the above non-limiting examples is operating with a different radio access technology. All of the relevant wireless communications at the UE 20 are facilitated via one or more antennas 20F. Also stored in the MEM 20B at reference number 20G are the computer code or algorithms for the UE to operate according to exemplary embodiments above by using the data/UE/AP type-specific thresholds to evaluate candidate APs for traffic offloading purposes, according the teachings detailed above by non-limiting example.

The eNB 22 also includes processing means such as at least one data processor (DP) 22A, storing means such as at least one computer-readable memory (MEM) 22B storing at least one computer program (PROG) 22C, and communication means such as a transmitter TX 22D and a receiver RX 22E for bidirectional wireless communications with the UE 20 on the first link 21A in the wide area network. All the wireless communications are via one or more antennas 22F, which for an eNB and many other base stations of other types of radio systems are typically implemented as an antenna array. Similar to the UE 20, the eNB 22 stores at block 22G its own computer software code or algorithms to cause the eNB 24 to operate as detailed above by sending to the UE the data/UE/AP type-specific thresholds to evaluate candidate APs for traffic offloading purposes.

The AP 24 is similar to the eNB 22 in its RF parts, and for the case in which they are co-located some of this hardware may be shared though functionally they operate as different network entities. The AP 24 includes processing means such as at least one data processor (DP) 24A, storing means such as at least one computer-readable memory (MEM) 24B storing at least one computer program (PROG) 24C, and communication means such as a transmitter TX 24D and a receiver RX 24E for bidirectional wireless communications with the UE 20 on the second link 21B in the wireless local area network via one or more antennas 24F.

Also at FIG. 3 is shown a higher network entity 26 above the eNB 22. In UTRAN (for example, HSDPA and WCDMA) this higher network entity 26 may be a radio network controller RNC, whereas in LTE/LTE-Advanced this entity 26 may be a MME and/or a S-GW as noted above. However implemented, the higher network entity 26 includes processing means such as at least one data processor (DP) 26A, storing means such as at least one computer-readable memory (MEM) 26B storing at least one computer program (PROG) 26C, and communication means such as a modem 26F for bidirectional communications with the macro eNB 22 and with other access nodes under its control or coordination over the data and control link 27.

While not particularly illustrated for the UE 20 or the eNB 22 or AP 24, those devices are also assumed to include as part of their wireless communicating means a modem and/or a chipset and/or an antenna chip which may or may not be inbuilt onto a radiofrequency (RF) front end module within those devices 20, 22, 24 and which also operates according to the teachings set forth above.

At least one of the PROGs 22C in the local MEM 22B of the network access nodes 22, as well as a PROG 20C in the local MEM 20B of the UE 20, is assumed to include a set of program instructions that, when executed by the associated DP 20A, 22A, 24A, enable the host radio device to operate in accordance with the exemplary embodiments of this invention, as detailed above. In these regards the exemplary embodiments of this invention may be implemented at least in part by computer software stored on the MEM 20B, 22B which is executable by the DP 22A of the network access node 22 and/or by the DP 20A of the UE 20; or by hardware, or by a combination of tangibly stored software and hardware (and tangibly stored firmware) in any one or more of these devices 20, 22. In this manner the respective DP with the MEM and stored PROG may be considered a data processing system. Electronic devices implementing these aspects of the invention need not be the entire devices as depicted at FIG. 3 or may be one or more components of same such as the above described tangibly stored software, hardware, firmware and DP, a system on a chip SOC, an application specific integrated circuit ASIC, a digital signal processor DSP, a modem, an antenna module, or a RF front end module as noted above.

In general, the various embodiments of the UE 20 can include, but are not limited to personal portable digital assistance devices having wireless communication capabilities, including but not limited to cellular and other mobile phones (including smart phones), navigation devices, laptop/palmtop/tablet computers, digital cameras and music devices, Internet appliances, USB dongles and data cards, machine-to-machine communication devices, and the like.

Various embodiments of the computer readable MEMs 20B, 22B, 24B, 26B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 24A, 26A include but are not limited to general purpose computers, special purpose computers, microprocessors, digital signal processors (DSPs) and multi-core processors.

Various modifications and adaptations to the foregoing exemplary embodiments of this invention may become apparent to those skilled in the relevant arts in view of the foregoing description. While the exemplary embodiments have been described above in the context of the E-UTRAN and UTRAN systems interworking with one or more WLANs, as noted above the exemplary embodiments of this invention are not limited for use with only these particular types of wireless radio access technology networks.

Further, some of the various features of the above non-limiting embodiments may be used to advantage without the corresponding use of other described features. The foregoing description should therefore be considered as merely illustrative of the principles, teachings and exemplary embodiments of this invention, and not in limitation, thereof.

What is claimed is:

1. A method for operating a user equipment, the method comprising:
   storing in a local memory of the user equipment at least a first set of thresholds and a second set of thresholds for use in offloading traffic to a wireless local area network, wherein
   at least the first set of thresholds and the second set of thresholds are received from a wireless wide area network,
   the first set of thresholds comprise different thresholds corresponding to different types of data to be offloaded, and
   the second set of thresholds comprise different thresholds corresponding to different classifications of different access nodes operating in one or more wireless local area networks;
   utilizing the threshold corresponding to a given type of data to evaluate whether an access node operating in the wireless local area network is suitable for offloading data of the given type;
   utilizing the evaluated access node for offloading only the data of the given type only if the evaluated access node is determined to be suitable using the threshold corresponding to the classification of the evaluated access node;
   determining at the user equipment that there are a plurality of access node candidates operating in the one or more wireless local area networks; and
   storing each of the access node candidates in the local memory within one of a plurality of candidate groups, each candidate group corresponding to one of the different classifications for which there is a different threshold in the second set.

2. The method according to claim 1, wherein the first set of thresholds comprise, for each different type of data to be offloaded:
load on the access node operating in the wireless local area network; and
quality of a link between the user equipment and the access node operating in the wireless local area network.

3. The method according to claim 1, wherein the first set of thresholds further comprise different thresholds corresponding to different types of data to be offloaded for each of a first and a second category of user equipments, wherein the first and the second category correspond to different subscription levels of the user equipment with an operator of the wireless wide area network.

4. The method according to claim 1, wherein the different classifications of the different access nodes correspond to different capabilities of the respective access nodes.

5. The method according to claim 4, wherein the different capabilities of the respective access nodes are determined based on which version of IEEE 802.11 technical standards the respective access node is operating.

6. The method according to claim 1, wherein the different types of data comprise at least delay intolerant data and delay tolerant data, wherein the delay intolerant data comprises at least voice and video data and the delay tolerant data comprises at least file transfer protocol data and Internet data that is not also voice or video data.

7. The method according to claim 1, wherein:
the wireless wide area network uses E-UTRA or UTRA radio access technology;
the evaluated access node is operating in the wireless local area network using IEEE 802.11 radio access technology; and
a first radio access node from which at least the first set of thresholds is received, and the evaluated access node, are controlled by a common network operator.

8. An apparatus comprising a processing system for operating a user equipment, the processing system comprising:
circuitry configured to:
store in the at least one memory at least a first set of thresholds and a second set of thresholds for use in offloading traffic to a wireless local area network, wherein
at least the first set of thresholds and the second set of thresholds are received from a wireless wide area network, and
the first set of thresholds comprise different thresholds corresponding to different types of data to be offloaded, and
the second set of thresholds comprise different thresholds corresponding to different classifications of different access nodes operating in one or more wireless local area networks;
utilize the threshold corresponding to a given type of data to evaluate whether an access node operating in the wireless local area network is suitable for offloading data of the given type; and
utilize the evaluated access node for offloading only the data of the given type only if the evaluated access node is determined to be suitable using the threshold corresponding to the classification of the evaluated access node;

determine at the user equipment that there are a plurality of access node candidates operating in the one or more wireless local area networks; and
store each of the access node candidates in the local memory within one of a plurality of candidate groups, each candidate group corresponding to one of the different classifications for which there is a different threshold in the second set.

9. The apparatus according to claim 8, wherein the first set of thresholds comprise, for each different type of data to be offloaded:
load on the access node operating in the wireless local area network; and
quality of a link between the user equipment and the access node operating in the wireless local area network.

10. The apparatus according to claim 8, wherein the first set of thresholds further comprise different thresholds corresponding to different types of data to be offloaded for each of a first and a second category of user equipments, wherein the first and the second category correspond to different subscription levels of the user equipment with an operator of the wireless wide area network.

11. The apparatus according to claim 8, wherein the different classifications of the different access nodes correspond to different capabilities of the respective access nodes.

12. The apparatus according to claim 11, wherein the different capabilities of the respective access nodes are determined based on which version of IEEE 802.11 technical standards the respective access node is operating.

13. The apparatus according to claim 8, wherein the different types of data comprise at least delay intolerant data and delay tolerant data, wherein the delay intolerant data comprises at least voice and video data and the delay tolerant data comprises at least file transfer protocol data and Internet data that is not also voice or video data.

14. The apparatus according to claim 8, wherein:
the wireless wide area network uses E-UTRA or UTRA radio access technology;
the evaluated access node is operating in the wireless local area network using IEEE 802.11 radio access technology; and
a first radio access node from which at least the first set of thresholds is received, and the evaluated access node, are controlled by a common network operator.

15. A user equipment comprising:
circuitry configured to:
store a first set of thresholds and a second set of thresholds for use in offloading traffic to a wireless local area network, wherein the first set of thresholds comprise different thresholds corresponding to different types of data to be offloaded, and the second set of thresholds comprise different thresholds corresponding to different classifications of different access nodes operating in one or more wireless local area networks;
determine at the user equipment that there are a plurality of access node candidates operating in the one or more wireless local area networks;
store each of the access node candidates in the local memory within one of a plurality of candidate groups, each candidate group corresponding to one of the different classifications for which there is a different threshold in the second set;
utilize the threshold corresponding to a given type of data to evaluate whether one of the plurality of access nodes operating in the wireless local area network is suitable for offloading data of the given type; and utilize the evaluated access node for offloading only the data of the given type only if the evaluated access node is determined to be suitable using the threshold corresponding to the classification of the evaluated access node.

16. The user equipment of claim 15, wherein the first set of thresholds comprise, for each different type of data to be offloaded:

load on the access node operating in the wireless local area network; and quality of a link between the user equipment and the access node operating in the wireless local area network.

17. The user equipment of claim 15, wherein the first set of thresholds further comprise different thresholds corresponding to different types of data to be offloaded for each of a first and a second category of user equipments, wherein the first and the second category correspond to different subscription levels of the user equipment with an operator of the wireless wide area network.

18. The user equipment of claim 15, wherein the different classifications of the different access nodes correspond to different capabilities of the respective access nodes.

* * * * *